Patented May 3, 1949

2,468,803

UNITED STATES PATENT OFFICE 2,468,803

METHOD OF PURIFYING SODIUM SULFATE

André Bonnet, Vaulx-en-Velin, and Pierre Costet, La Voulte-sur-Rhone, France, assignors to Comptoir des Textiles Artificiels, a corporation of France No Drawing. Application January 28, 1947, Serial No. 724,932. In France September 26, 1941

Section 1, Public Law 690, August 8, 1946
Patent expires September 26, 1961

7 Claims. (Cl. 23—121)

This invention relates to a method of purifying sodium sulfate. More particularly, it relates to a method of purifying sodium sulfate to remove the impurities contained therein which are detrimental to the electrolysis of sodium sulfate.

Sodium sulfate is normally purified by fractional crystallization. Such process produces a chemically pure salt which is capable of use where pure salts are desired, such as, for example, in the pharmaceutical industry. However, such process is too expensive for use in the production of sodium sulfate for industrial purposes. Moreover, for certain industrial uses some impurities in sodium sulfate can be particularly detrimental, while in other industries certain impurities will not offer any inconvenience.

When sodium sulfate is to be utilized as the raw material for the manufacture of sodium by electrolysis, the impurities which are the most detrimental to the proper functioning of the electrolysis are the salts of heavy metals, alkaline earth metals, and arsenic derivatives. Such salts are originally mixed with natural sodium sulfate in the crude condition, or result from chemical treatments which the sodium sulfate undergoes as, for example, when sodium sulfate is used in a viscose spinning bath.

An object of this invention is to provide a new and improved method of purifying sodium sulfate.

Another object of this invention is to provide a method of producing sodium sulfate which can be used as the raw material in the production of sodium by electrolysis.

A further object of this invention is to remove the salts of heavy metals, alkaline earth metals and arsenic derivatives from sodium sulfate.

A specific object of this invention is to purify sodium sulfate recovered from spent viscose spinning baths.

Other and additional objects will become apparent hereinafter.

The objects of this invention are accomplished, in general, by treating a solution of the sodium sulfate simultaneously with trisodium phosphate and sodium sulfide until a liquid is obtained which no longer reacts with a soluble ferrocyanide and sodium sulfide.

The trisodium phosphate and sodium sulfide precipitate the metal impurities, such as lead, iron, zinc, cadmium, arsenic and alkaline earth metals, and at the same time carry down the insoluble impurities, such as sulfur.

Trisodium phosphate alone can precipitate the aforementioned metals while sodium sulfide itself is capable of precipitating the heavy metal salts. However, tests have shown that for obtaining substantially complete precipitation it is necessary to add both the trisodium phosphate and sodium sulfide.

Other combinations of precipitating agents can be used, such as, for example, a combination including activated carbon or fuller's earth. However, the conjoint use of trisodium phosphate and sodium sulfide gives the best results.

The precipitate obtained by this process is generally very fine and can be separated by several successive filtrations through cloth or wadding. However, in the preferred embodiment of the invention, the treated solution is first filtered through a suitable filter, such as wadding or cloth, and the filtrate centrifuged in a high speed centrifuge, such as a centrifuge revolving at 30,000 revolutions per minute. The resulting solution of sodium sulfate which, in general, is slightly alkaline, is stored in an appropriate storage vessel, such as, for example, stoneware vats with pitch joints. Prior to storage, the solution can be concentrated or diluted as desired.

The details and manner of practicing the invention will become apparent by reference to the following specific example, it being understood that this example is merely an illustrative embodiment of the invention and that the scope of the invention is not limited thereto.

Example

A spent viscose spinning bath, originally containing 100 grams sulfuric acid, 250 grams sodium sulfate and 20 grams zinc sulfate per liter, is concentrated by evaporation down to half of its volume. The concentrated solution is subjected to a temperature of 0° C. whereby decahydrated sodium sulfate is crystallized. The mass is then centrifuged and, during this operation, the crude sodium sulfate is washed and finally neutralized with carbonate. The sodium sulfate is then dissolved in water to produce a solution of 20° Bé. A solution containing 300 grams trisodium phosphate and 400 grams sodium sulfide per cubic M is added until the solution does not react with a soluble ferrocyanide and sodium sulfide. The mass is then filtered at 40° C. over wadding, and the filtrate centrifuged in a high speed centrifuge rotating at 30,000 revolutions per minute.

The invention is not limited to purifying sodium sulfate recovered from spent viscose spinning baths. It can be applied to the recovery and purification of sodium sulfate resulting from other chemical processes and even to the purification of natural sodium sulfate.

The precipitation of the impurities is carried out in an aqueous medium in which the sodium sulfate is dissolved. The aqueous solution can be obtained either by fusing sodium sulfate decahydrate in its own water of crystallization or by dissolving the sulfate in water.

As shown by the example, a 20° Bé. solution of sodium sulfate is preferred. However, an aqueous solution containing a greater or lesser concentration of sodium sulfate can be used.

In the preferred embodiment of the invention, as shown by the example, the trisodium phosphate and the sodium sulfide are dissolved in water, and such solution is added to the solution of the sodium sulfate. The ratio of the trisodium phosphate to the sodium sulfide in the solution is not critical. The trisodium phosphate and sodium sulfide can be used in equal quantities, or either may be used in excess of the other. In the preferred embodiment as shown by the example, the trisodium phosphate is in excess of the sodium sulfide.

The concentration of both the trisodium phosphate and sodium sulfide in the solution can vary within wide limits. In general, the concentration is such that only a small amount of the reagents can be added.

The sodium sulfate resulting from the process of this invention can be subjected to electrolysis for the preparation of sodium. Since the sodium sulfate is free of the impurities which normally effect the electrolysis, the latter will proceed in a satisfactory manner.

Since it is obvious that various changes and modifications may be made in the above description without departing from the nature or spirit thereof, this invention is not restricted thereto except as set forth in the appended claims.

We claim:

1. A method of treating sodium sulfate to remove the metal salt impurities contained therein which comprises simultaneously adding trisodium phosphate and sodium sulfide to a neutral aqueous solution of the sodium sulfate, and removing the precipitate from the sodium sulfate solution.

2. A method of treating sodium sulfate to remove the metal salt impurities contained therein which comprises simultaneously adding trisodium phosphate and sodium sulfide to a neutral aqueous solution of the sodium sulfate, filtering the mass, and centrifuging the filtrate at a high speed.

3. A method of treating sodium sulfate to remove the metal salt impurities contained therein which comprises simultaneously adding trisodium phosphate and sodium sulfide to a neutral aqueous solution of the sodium sulfate until the sodium sulfate solution no longer reacts with a soluble ferrocyanide and sodium sulfide, and removing the precipitate from the solution.

4. A method of treating sodium sulfate to remove the metal salt impurities contained therein which comprises simultaneously adding trisodium phosphate and sodium sulfide to a neutral aqueous solution of the sodium sulfate until the sodium sulfate solution no longer reacts with a soluble ferrocyanide and sodium sulfide, filtering the mass, and centrifuging the filtrate at a high speed.

5. A method of treating sodium sulfate to remove the metal salt impurities contained therein which comprises adding an aqueous solution containing trisodium phosphate and sodium sulfide to a neutral aqueous solution of the sodium sulfate, and thereafter removing the precipitate from the sodium sulfate solution.

6. A method of treating sodium sulfate to remove the metal salt impurities contained therein which comprises adding an aqueous solution containing 300 grams trisodium phosphate and 400 grams sodium sulfide per cubic M to a neutral aqueous 20° Bé. solution of the sodium sulfate until the sodium sulfate solution no longer reacts with a soluble ferrocyanide and sodium sulfide, filtering the mass, and centrifuging the filtrate at high speed.

7. A method of treating sodium sulfate to remove the metal salt impurities contained therein which comprises adding an aqueous solution containing 300 grams trisodium phosphate and 400 grams sodium sulfide per cubic M to a neutral aqueous 20° Bé. solution of the sodium sulfate until the sodium sulfate solution no longer reacts with a soluble ferrocyanide and sodium sulfide, filtering the mass at 40° C. through wadding, and centrifuging the filtrate at 30,000 revolutions per minute.

ANDRÉ BONNET.
PIERRE COSTET.

REFERENCES CITED

The following references are of record in the file of this patent:

UNITED STATES PATENTS

| Number | Name | Date |
| --- | --- | --- |
| 2,392,669 | Hirsch | Jan. 8, 1946 |